G. M. BARTLETT.
UNIVERSAL JOINT.
APPLICATION FILED JULY 12, 1915.
1,184,915.
Patented May 30, 1916.
2 SHEETS—SHEET 1.
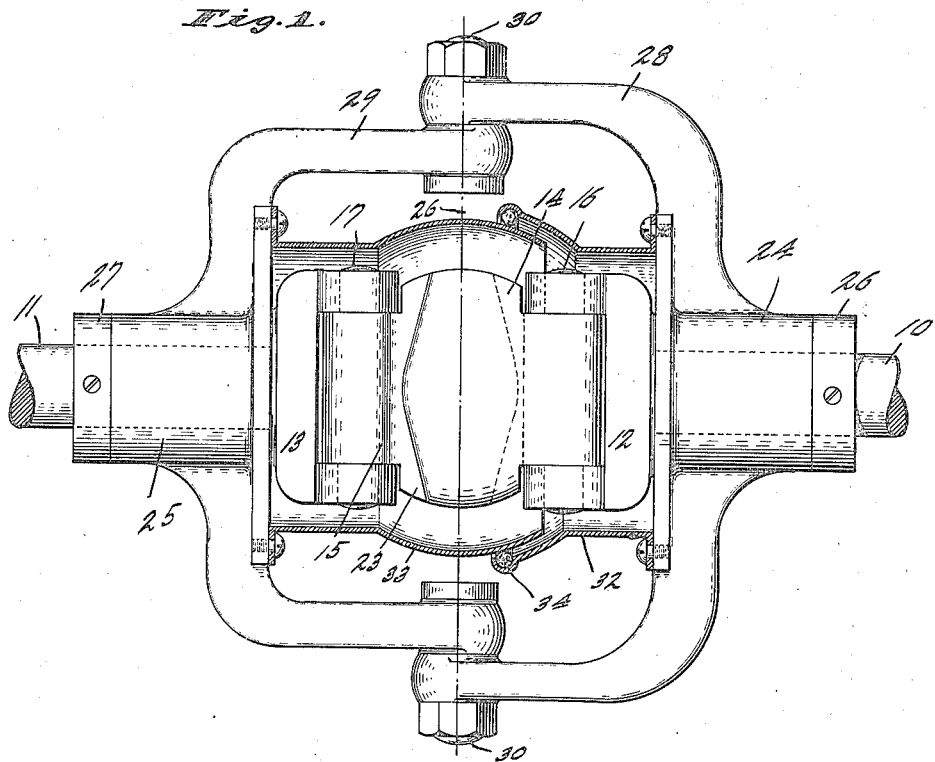
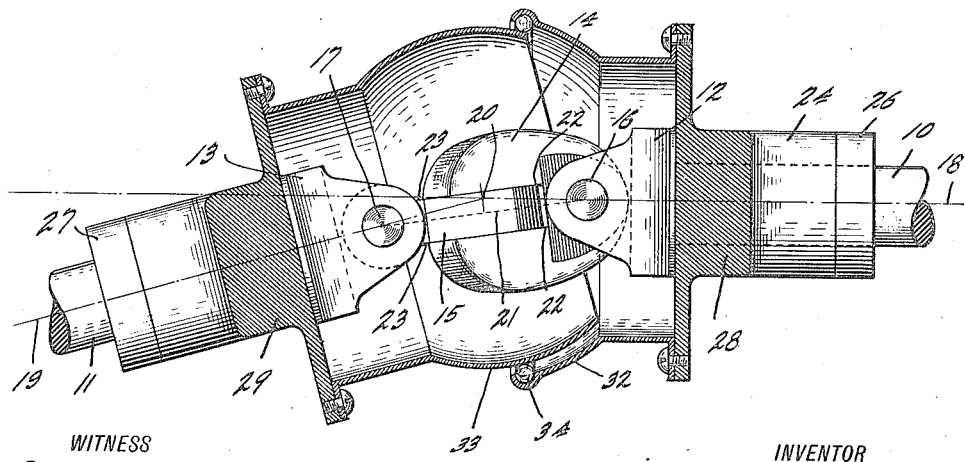
WITNESS
Frank A. Fahle
INVENTOR
George M. Bartlett,
BY
Hood & Schley,
ATTORNEYS

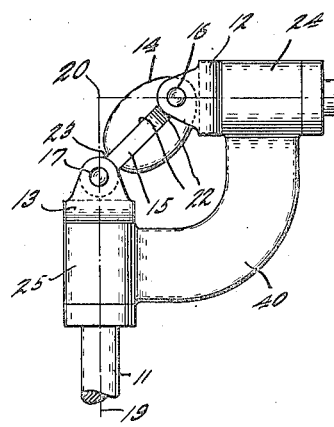
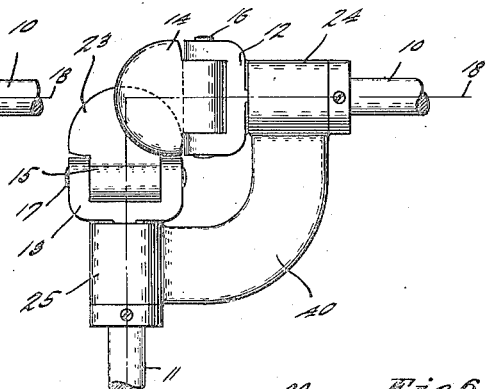
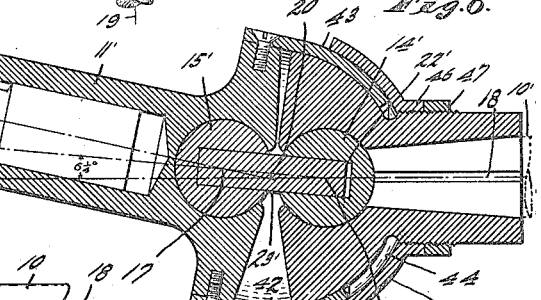
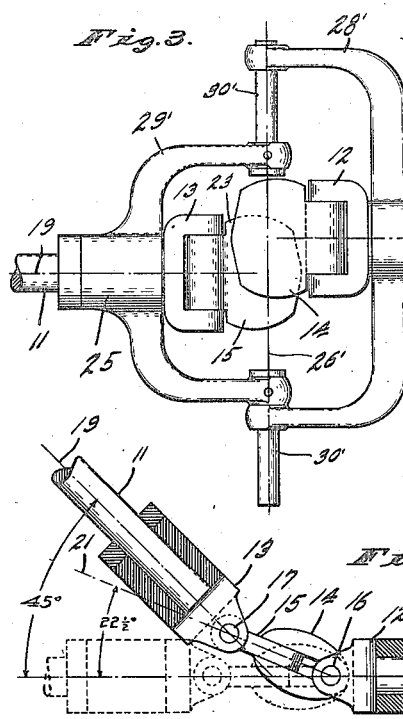
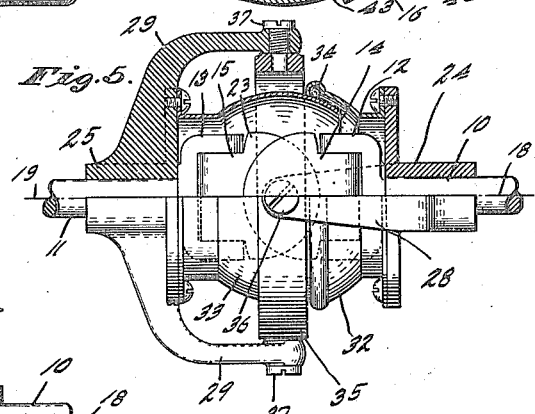
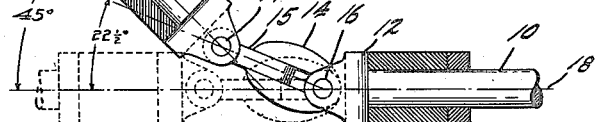

ically to each other in any plane; Fig. 6 is a section through another form of joint embodying my invention, with the two shaft ends held in proper relative position by parts which rotate with them and also serve as a dust and oil proof casing; Fig. 7 is a view showing my universal joint with a fixed angle of 90° between the two shaft ends; and Fig. 8 is a view similar to Fig. 7, but with the two shafts each rotated 90° from the position shown in Fig. 7.

UNITED STATES PATENT OFFICE.

GEORGE M. BARTLETT, OF INDIANAPOLIS, INDIANA.

UNIVERSAL JOINT.

1,184,915.

Specification of Letters Patent. Patented May 30, 1916.

Application filed July 12, 1915. Serial No. 39,269.

*To all whom it may concern:*

Be it known that I, GEORGE M. BARTLETT, a citizen of the United States, residing at Indianapolis, in the county of Marion and State of Indiana, have invented a new and useful Universal Joint, of which the following is a specification.

It is the object of my invention to provide a universal joint which will transmit rotary motion between two shafts and will maintain constantly equal the angular velocity of the driving and driven shafts under the following conditions: (a) when the axes of the two shafts intersect and are at any angle from 0° to more than 90°; (b) when the axes of the two shafts are parallel but not in alinement; (c) when the axes of the two shafts are neither parallel nor intersecting; and to do this by a construction which is simple and inexpensive to construct and is at the same time strong and compact.

In carrying out my invention, I pivotally connect a member to each of the two shaft ends on a pivotal axis perpendicular to the axis of such shaft end, and provide each of these members with opposite parallel plane surfaces which engage mating parallel plane surfaces on the other member, and locate these parallel surfaces and pivotal axes so that both pivotal axes are always parallel to such mating parallel surfaces; and I provide means for maintaining said mating parallel surfaces always at equal angles to the axes of the two shaft ends as the latter rotate.

My invention can take a number of forms, and I have illustrated some of the preferred forms in the accompanying drawings.

Figure 1 is a plan view, partly in section, of a universal joint embodying my invention, with the two shaft ends in alinement; Fig. 2 is a view taken at right angles to Fig. 1, showing the same joint, but with the shaft ends at an angle to each other; Fig. 3 is a plan view of substantially the same joint as shown in Fig. 1, without the dust proof lubricant casing and with the two shafts out of alinement but parallel; Fig. 4 is a semi-diagrammatic view, showing the universal joint of Fig. 3 and taken at right angles to Fig. 3, with the two shaft ends at an angle of 45° to each other; Fig. 5 is a plan view, in partial section, through a form of joint embodying my invention, with the two shaft ends capable of swinging rela- In the form of joint shown in Figs. 1 and 2, the two shaft ends 10 and 11 have fixed on their adjacent ends yokes 12 and 13 in which two members 14 and 15 are pivoted on axes 16 and 17, which axes are perpendicular to the axes 18 and 19 of the shaft ends 10 and 11, and in this case are furnished by pivot pins. The pivotal axes 16 and 17 are maintained equi-distant from the intersecting point 20 of the two axes 18 and 19 when such axes intersect, and the axes 16 and 17 always lie in a common plane 21 which at all times forms equal angles with the two axes 18 and 19 as such plane 21 rotates with the shaft ends 10 and 11 by mechanism hereinafter described. The member 14 is provided with two opposite, inwardly facing, parallel, plane surfaces 22, which are engaged by two opposite, outwardly facing, parallel, plane surfaces 23, which mate with the surfaces 22 and slide thereupon as required. Thus the member 15 forms a tongue which slidingly fits into a groove in the member 14. The surfaces 22 and 23 are parallel to the plane 21 and to the pivotal axes 16 and 17. Though none of the plane surfaces 22 and 23 are shown coincident with the plane 21, this lack of coincidence is not essential. Neither is it essential that there be but two surfaces 22 and two surfaces 23.

The shaft ends 10 and 11 are mounted in bearings 24 and 25, being held from axial sliding in such bearings by the yokes 12 and 13 and by collars 26 and 27. The two bearings 24 and 25 are pivotally interconnected on an axis 26' (Fig. 3) which passes through the point 20. This is conveniently done by providing the bearings with arms 28 and 29 which are connected by pivot pins 30 lying in the axis 26.

In operation, the rotation of one of the shaft ends 10 and 11 around its axis 18 and 19, at whatever angle such axes may be to each other, causes the other shaft end to rotate with equal angular velocity around its axis, by the driving connection formed by the two members 14 and 15 and their mating parallel surfaces 22 and 23. As the parts rotate, the members 14 and 15 rotate about the axis of rotation of the plane 21, which axis in the arrangement shown, is determined by the points of intersection of the axes 18 and 19 with the axes 16 and 17 respectively. The pivotal interconnection of the two bearings 24 and 25, by the arms 28 and 29 and the pins 30, maintains the axis 26 and therefore the point 20 at equal distances from the axes 16 and 17, so that the plane 21 as it rotates is always at equal angles to the two shafts 18 and 19.

In the form of joint shown in Figs. 1 and 2 a lubricant casing may be employed inclosing the members 14 and 15 and the yokes 12 and 13. In the form shown, this comprises a member 32 carried by the bearing 24 and a member 33 carried by the bearing 25, the member 33 fitting into the member 32 along a spherical surface formed on the member 33 and bearing against a packing 34 carried in a groove on the inner surface of the member 32. The center of the spherical surface referred to is the point 20. It will be apparent that other surfaces of revolution, each having an axis perpendicular to the plane of Fig. 2 and passing through point 20, will be satisfactory for this purpose.

In the form of joint shown in Figs. 1 and 2, the axes of the two shafts 10 and 11 necessarily intersect, and can only be swung relatively to each other about a single axis. Sometimes it is desirable that the two shaft ends be capable of swinging relatively to each other universally, in which case a joint such as shown in Fig. 5 may be used. In this form of joint there are the same shaft ends 10 and 11, yokes 12 and 13, pivoted members 14 and 15 having the parallel surfaces 22 and 23, and bearings 24 and 25 having arms 28 and 29; and there may be the same lubricant container 32—33—34. In order to provide for the universal movement, however, the arms 28 and 29 are not directly pivoted together, but are arranged at right angles to each other and are pivotally connected to a ring 35 by pivot pins 36 and 37, which all lie in a common plane and are arranged on pivotal axes which intersect each other at right angles at the point 20. The action of this joint is the same as that shown in Figs. 1 and 2, save that the shaft ends 10 and 11 may be tilted relatively to each other in any direction, instead of being limited to motion in a single plane as is the joint shown in Figs. 1 and 2.

Both of the joints so far described have the axes 18 and 19 intersecting. Either joint can readily be modified to provide for non-intersecting axes, whether such axes are parallel with or at an angle to each other. This may be done by shifting either bearing 24 or 25 relatively to the other along the axis 26 (in Figs. 1 and 2) or along the axes of either or both sets of pins 36 and 37 (in Fig. 5). The shifting may be either permanent or adjustable, as desired. A joint in which this shifting is provided for is shown in Fig. 3. In this joint there are the same shaft ends 10 and 11, yokes 12 and 13, pivoted members 14 and 15 having the mating parallel surfaces 22 and 23, and bearings 24 and 25. The bearings 24 and 25 are provided with arms 28' and 29' connected by pivot pins 30'. The arms 28', however, have a considerably greater span than have the arms 29', and the pins 30' are made longer than are the pins 30 of Fig. 1, so that the arms 29' can slide along the axis 26' of the pins 30' relatively to the arms 28', to shift the axes 18 and 19 of the shaft ends laterally relatively to each other, as is clear from Fig. 3. Any desired amount of shifting may be had, provided sufficient interengagement of the surfaces 22 and 23 is retained. The amount of lateral shifting is variable in the form shown in Fig. 3, but in case it is not desired to have this shifting variable the arms 28' and 29' may be relatively fixed on the axis 26', in any suitable manner.

The form of joint shown in Fig. 3 will give equal angular velocities of the shaft ends 10 and 11. (a) When the axes 18 and 19 are in alinement, (b) when the axes 18 and 19 intersect at an angle, (c) when the axes 18 and 19 are parallel but out of alinement, (d) when the axes 18 and 19 do not intersect and are at an angle to each other, which last condition is obtained by tilting the bearing 25 and the arms 29' about the axis 26' when the two axes 18 and 19 have been shifted laterally as shown in Fig. 3. In any of these cases, the mating parallel surfaces 22 and 23 are always parallel to the plane 21 determined by the pivotal axes 16 and 17 as the shaft ends 10 and 11 rotate, and the interaction of the arms 28' and 29' keeps this plane 21 always at equal angles to the two axes 18 and 19 no matter how such axes may be moved relatively to each other. In Fig. 4 these two axes 18 and 19 are shown at an angle of 45° to each other, in which case the plane determined by the axis 26' and the line joining the intersection of the axes 16 and 18 with the intersection of the axes 17 and 19 is at an angle of 22½° to each of the axes 18 and 19.

Sometimes an adjustable angle between the two shaft ends is not necessary. In such case the two bearings 24 and 25 may be rigidly interconnected, to hold the shaft ends 10 and 11 at any desired angle. Such a structure is shown in Figs. 7 and 8, where there are the same shaft ends 10 and 11, yokes 12 and 13, pivoted members 14 and 15 interengaging on mating parallel surfaces 22 and 23, and bearings 24 and 25. The bearings 24 and 25, however, are interconnected by a rigid arm 40, which holds the axes of said bearings and therefore the axes 18 and 19 at the desired angle, which in this case is a right angle. Figs. 7 and 8 show this joint in two positions of the parts. As either shaft end 10 or 11 rotates, the motion of the one is transmitted to the other through the members 14 and 15 and the angular velocities of the two shaft ends are maintained constantly equal.

In the joints previously described the proper relation of the axes 16 and 17 to each other and of the plane 21 to the two axes 18 and 19 has been maintained by non-rotatable bearings 24 and 25 supporting the shaft ends and interconnections between such bearings. If desired, these non-rotatable parts may be dispensed with, and rotatable parts used instead. A joint embodying this modification is shown in Fig. 6. In this joint there are the same shaft ends 10' and 11', in which are pivotally mounted members 14' and 15', though the pivotal support in this case is furnished by the exterior cylindrical surfaces of the members 14' and 15' in coöperation with the interior cylindrical surfaces on the enlarged heads formed on such shaft ends. As in the other cases, the axes 16 and 17 of the members 14' and 15' are at right angles to the axes 18 and 19 of the two shaft ends. The members 14' and 15' are provided with mating plane parallel surfaces 22' and 23', which in this case are formed by a groove in the member 14' and a projecting tongue on the member 15', as in the other forms of joint, save that the groove in the member 14' does not project past the intersecting point 20 of the two axes 18 and 19 when such axes are out of alinement. This point of intersection 20 is maintained constantly equidistant from the two axes 16 and 17, and the plane determined by the axes 16 and 17, which is parallel to the plane surfaces 22' and 23', is maintained constantly at equal angles to the axes 18 and 19, by a member 41 fixed on the shaft end 10' and having interior and exterior spherical surfaces 42 and 43 which slidingly fit on interior and exterior spherical surfaces 44 and 45 on the shaft end 11', the spherical surface 45 being provided by a collar 46 which may have a screw-threaded mounting 47 on such shaft end, so as to permit assembly and provide a suitable adjustment between the surfaces 44 and 45. These spherical surfaces 42, 43, 44, and 45 have the point 20 as their common center. As the two shaft ends rotate with their axes 18 and 19 at an angle to each other the surfaces 42 and 43 slide on the surfaces 44 and 45, but because such surfaces are spherical surfaces, having the point 20 as their center, they serve to maintain such center 20 constantly equidistant from the axes 16 and 17, and the plane 21 constantly at equal angles to the axes 18 and 19. The members 41 and 46 also provide a dust proof lubricant casing.

I have illustrated my invention in a few of its simpler forms, which are capable of considerable variation. For instance, I have shown the members 14 and 15 as unitary members; the unitary structure is not essential, as these members may comprise any desired number of parts (as indicated by parts 15' and 23', Fig. 6). Likewise, I have shown each of these members as being provided with a single pair of oppositely facing parallel plane surfaces 22 or 23; it is apparent that this single pair of such surfaces is typical of a plurality of mating surfaces. It is not essential that there be but a single pair of mating members 14 and 15 connecting the two shaft ends, or that any pair of such members overlap the axes 18 and 19, though in the embodiments of my invention shown in the drawings both these features are present.

In addition, while I have shown the two axes 16 and 17 as separated from each other, for simplicity of explanation, this separation is not essential, though, of course, if the two axes 16 and 17 intersect elsewhere than at the point 20 they will never coincide, and if they intersect at the point 20 they will coincide permanently only when the axes 18 and 19 coincide and otherwise will merely be coincident at two points during the rotation of the shaft ends. If the two axes 16 and 17 coincide at the point 20, the distances of such axes from such point will no longer be finite distances, such as illustrated, but they will still be equal. Furthermore, while the best results are obtained with the axes 16 and 17 intersecting the axes 18 and 19, and doing so perpendicularly, this is not in all cases essential, the primary requirement being that the axes 16 and 17 be transverse to the axes 18 and 19.

I claim as my invention:

1. In combination, two shaft ends having intersecting axes, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, the pivotal axes on which said members are pivotally associated with the shaft ends being parallel to said mating parallel plane surfaces, and means for maintaining constantly equal the angles formed by the axes of the two shaft ends with such mating parallel plane surfaces.

2. In combination, two shaft ends, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, the pivotal axes on which said members are pivotally associated with the shaft ends being parallel to said mating parallel plane surfaces, and means for maintaining constantly equal the angles formed by the axes of the two shaft ends with such mating parallel plane surfaces.

3. In combination, two shaft ends having intersecting axes, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, the pivotal axes on which said members are pivotally associated with the shaft ends being parallel to said mating parallel plane surfaces, and means for keeping the intersection of the axes of the two shaft ends constantly equi-distant from the pivotal axes on which said pivotally associated members are connected to said shaft ends.

4. In combination, two shaft ends having intersecting axes, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends.

5. In combination, two shaft ends, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends.

6. In combination, two shaft ends having intersecting axes, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting said two shaft ends and maintaining the point of intersection of the axes of said shaft ends constantly equidistant from the pivotal axes on which said pivotally associated members are connected to said shaft ends.

7. In combination, two shaft ends having intersecting axes, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends, said interconnecting means permitting relative angular movement between the axes of said two shaft ends.

8. In combination, two shaft ends, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends, said interconnecting means permitting relative angular movement between the axes of said two shaft ends.

9. In combination, two shaft ends having intersecting axes, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting said two shaft ends and maintaining the point of intersection of the axes of said shaft ends constantly equidistant from the pivotal axes on which said pivotally associated members are connected to said shaft ends, said interconnecting means permitting relative angular movement between the axes of said two shaft ends.

10. In combination, two shaft ends, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends, said last named means permitting lateral shifting between the axes of said two shaft ends and also variation of the angle between two such axes.

11. In combination, two shaft ends, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends, said last named means permitting lateral shifting between the axes of said two shaft ends.

12. In combination, two shaft ends, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, the pivotal axes on which said members are pivotally associated with the shaft ends being parallel to said mating parallel plane surfaces, and means for maintaining constantly equal the angles formed by the axes of the two shaft ends with such mating parallel plane surfaces, said last named means permitting lateral shifting between the axes of said two shaft ends and also variation of the angle between two such axes.

13. In combination, two shaft ends, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, the pivotal axes on which said members are pivotally associated with the shaft ends being parallel to said mating parallel plane surfaces, and means for maintaining constantly equal the angles formed by the axes of the two shaft ends with such mating parallel plane surfaces, said last named means permitting lateral shifting between the axes of said two shaft ends.

14. In combination, two shaft ends having intersecting axes, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, and the pivotal axes on which said members are pivotally associated with the shaft ends being parallel to said mating parallel plane surfaces.

15. In combination, two shaft ends, a member pivotally associated with each of said shaft ends on an axis perpendicular to the axis of such shaft end, each of said pivotally associated members being provided with oppositely facing plane parallel surfaces slidably engaging mating surfaces on the other member and slidable relatively to the other member in any direction parallel to such surfaces, and the pivotal axes on which said members are pivotally associated with the shaft ends being parallel to said mating parallel plane surfaces.

16. In combination, two shaft ends having intersecting axes, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members.

17. In combination, two shaft ends, a member pivotally associated with each of said shaft ends on an axis perpendicular to the axis of said shaft end, said two pivotally associated members being slidably interconnected to move relatively to each other in any direction in a plane which as the shaft ends rotate is constantly parallel to the pivotal axes of both of said pivotally associated members.

18. In combination, two end shafts, a member pivotally associated with each of said shaft ends on an axis transverse to the axis of such shaft end, each of said pivotally associated members being provided with oppositely facing plane parallel surfaces slidably engaging mating surfaces on the other member, and slidable relatively to the other member in any direction parallel to such surfaces, the pivotal axes on which said members are pivotally associated with the shaft ends being parallel to said mating parallel plane surfaces, and means for maintaining constantly equal the angles formed by the axes of the two shaft ends with such mating parallel plane surfaces.

19. In combination, two shaft ends, a member pivotally associated with each of said shaft ends on an axis transverse to the axis of such shaft end, each of said pivotally associated members being provided with oppositely facing plane parallel surfaces slidably engaging mating surfaces on the other member, and slidable relatively to the other member in any direction parallel to such surfaces, the pivotal axes on which said members are pivotally associated with the shaft ends being parallel to said mating parallel plane surfaces.

20. In combination, two shaft ends, a member pivotally associated with each of said shaft ends on an axis transverse to the axis of said shaft end, said two pivotally associated members being slidably interconnected to move relatively to each other in any direction in a plane which as the shaft ends rotate is constantly parallel to the pivotal axes of both of said pivotally associated members, and means interconnecting the shaft ends to maintain said plane constantly at equal angles with the axes of said two shaft ends.

21. In combination, two shaft ends, a member pivotally associated with each of said shaft ends on an axis transverse to the axis of said shaft end, said two pivotally associated members being slidably interconnected to move relatively to each other in any direction in a plane which as the shaft ends rotate is constantly parallel to the pivotal axes of both of said pivotally associated members.

In witness whereof, I have hereunto set my hand at Indianapolis, Indiana, this ninth day of July, A. D. one thousand nine hundred and fifteen.

GEORGE M. BARTLETT.